US012026862B2

(12) United States Patent
Yungers et al.

(10) Patent No.: US 12,026,862 B2
(45) Date of Patent: Jul. 2, 2024

(54) APPARATUS AND METHODS FOR PREPROCESSING IMAGES HAVING ELEMENTS OF INTEREST

(71) Applicant: 3M INNOVATIVE PROPERTIES COMPANY, St. Paul, MN (US)

(72) Inventors: Christopher R. Yungers, St. Paul, MN (US); Nathan A. Christopherson, Woodbury, MN (US); Jonathan D. Gandrud, Woodbury, MN (US); Justin M. Johnson, Hudson, WI (US); Subhalakshmi M. Falknor, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 72 days.

(21) Appl. No.: 17/640,440

(22) PCT Filed: Oct. 8, 2020

(86) PCT No.: PCT/IB2020/059470
§ 371 (c)(1),
(2) Date: Mar. 4, 2022

(87) PCT Pub. No.: WO2021/070111
PCT Pub. Date: Apr. 15, 2021

(65) Prior Publication Data
US 2022/0343092 A1 Oct. 27, 2022

Related U.S. Application Data

(60) Provisional application No. 62/913,979, filed on Oct. 11, 2019.

(51) Int. Cl.
*G06T 5/92* (2024.01)
*G06K 7/14* (2006.01)
(Continued)

(52) U.S. Cl.
CPC ............. *G06T 5/92* (2024.01); *G06K 7/1413* (2013.01); *G06T 7/11* (2017.01); *G06T 7/136* (2017.01);
(Continued)

(58) Field of Classification Search
CPC . G06T 5/009; G06T 7/136; G06T 7/11; G06T 7/90; G06K 7/1413; G06K 7/10693; G06K 7/14
(Continued)

(56) References Cited

U.S. PATENT DOCUMENTS 6,088,137 A 7/2000 Tomizawa
7,403,654 B2 6/2008 Wu
(Continued)

FOREIGN PATENT DOCUMENTS

CA 2285110 5/2000
CN 103559499 2/2017
(Continued)

OTHER PUBLICATIONS

International Search Report for PCT International Application No. PCT/IB2020/059470, mailed on Dec. 9, 2020, 5 pages.
(Continued)

*Primary Examiner* — Edwyn Labaze
(74) *Attorney, Agent, or Firm* — X. Christina Huang; Sriram Srinivasan (57) ABSTRACT

At least some embodiments of the present disclosure directs to a method for processing an input image having an embedded element, comprising the steps of: computing one or more histograms of the input image; identifying a range of interest in one of the one or more histograms; and determining, by the processor, a threshold based on the
(Continued)

range of interest. In some embodiments, a computing device processes the input image using the threshold to generate an output image.

15 Claims, 12 Drawing Sheets

(51) Int. Cl.
 *G06T 7/11* (2017.01)
 *G06T 7/136* (2017.01)
 *G06T 7/90* (2017.01)
 *G06V 10/28* (2022.01)
(52) U.S. Cl.
 CPC ...... *G06T 7/90* (2017.01); *G06T 2207/10016* (2013.01); *G06T 2207/10024* (2013.01); *G06T 2207/30204* (2013.01); *G06V 10/28* (2022.01)
(58) Field of Classification Search
 USPC .................................. 235/462.01, 454, 375
 See application file for complete search history.

(56) References Cited

U.S. PATENT DOCUMENTS

| | | | |
|---|---|---|---|
| 7,636,112 B2 | 12/2009 | Hsu | |
| 8,472,717 B2 | 6/2013 | Wang | |
| 9,706,102 B1* | 7/2017 | McInerny | G09G 5/393 |
| 2002/0172417 A1* | 11/2002 | Nicolas | H04N 9/646 |
| | | | 348/E9.042 |
| 2004/0197021 A1 | 10/2004 | Huang | |
| 2005/0286387 A1* | 12/2005 | Ayres | G11B 7/0065 |
| 2007/0047834 A1 | 3/2007 | Connell | |
| 2008/0023546 A1* | 1/2008 | Myodo | G06K 7/14 |
| | | | 235/462.15 |
| 2011/0249867 A1 | 10/2011 | Haas | |
| 2012/0163714 A1* | 6/2012 | Cvetkovic | H04N 1/44 |
| | | | 382/166 |
| 2014/0144991 A1 | 5/2014 | Tian | |
| 2016/0086051 A1 | 3/2016 | Piekniewski | |
| 2017/0289434 A1 | 10/2017 | Eslami | |
| 2018/0089812 A1* | 3/2018 | Wang | H04N 1/6005 |
| 2018/0349695 A1* | 12/2018 | Le Henaff | G06T 7/42 |
| 2019/0034693 A1* | 1/2019 | Zang | G06T 7/20 |
| 2022/0182430 A1* | 6/2022 | Bennett-James | |
| | | | H04N 21/44008 |

FOREIGN PATENT DOCUMENTS

| | | |
|---|---|---|
| CN | 104599271 | 4/2017 |
| CN | 104751487 | 6/2017 |
| CN | 105184812 | 8/2018 |
| EP | 2709063 | 3/2014 |
| KR | 10-1470763 | 12/2014 |
| WO | WO 2017-034323 | 3/2017 |

OTHER PUBLICATIONS

Written Opinion of International Preliminary Examining Authority for PCT International Application No. PCT/IB2020/059470, mailed on Sep. 20, 2021, 5 pages.

International Preliminary Report on Patentability for PCT International Application No. PCT/IB2020/059470, mailed on Jan. 25, 2022, 5 pages.

* cited by examiner

Blue Color Plane

FIG. 4A

Blue Color Plane Histogram

FIG. 4B

Blue Color Plane Threshold

FIG. 4C

Green Color Plane

FIG. 4D

Green Color Plane Histogram

FIG. 4E

Green Color Plane Threshold

FIG. 4F

Red Color Plane

FIG. 4G

Red Color Plane Histogram

FIG. 4H

Red Color Plane Threshold

FIG. 4I

APPARATUS AND METHODS FOR PREPROCESSING IMAGES HAVING ELEMENTS OF INTEREST

CROSS REFERENCE TO RELATED APPLICATIONS

This application is a national stage filing under 35 U.S.C. 371 of International Application No. PCT/IB2020/059470, filed on 8 Oct. 2020, which claims the benefit of Provisional U.S. Patent Application No. 62/913,979, filed on 11 Oct. 2019, the entire disclosure of each of which is incorporated by reference herein.

TECHNICAL FIELD

The present disclosure relates to preprocessing for images having elements of interest.

SUMMARY

At least some embodiments of the present disclosure directs to a method for processing an input image having an embedded element, comprising the steps of: computing, by a processor, one or more histograms of the input image, wherein each of the one or more histograms is computed on a color plane in a color space; selecting a color plane in the color space; identifying a range of interest in one of the one or more histograms, the one of the one or more histograms computed on the selected color plane; determining, by the processor, a threshold based on the range of interest; and processing, by the processor, the input image using the threshold to generate an output image, wherein the range of interest is identified at least in part based on a known color intensity of the embedded element.

At least some embodiments of the present disclosure directs to a device comprising: a processor; and a memory device coupled to the processor and having a program stored thereon for execution by the processor to perform operations comprising: computing one or more histograms of the input image, wherein each of the one or more histograms is computed on a color plane in a color space; selecting a color plane in the color space; identifying a range of interest in one of the one or more histograms, the one of the one or more histograms computed on the selected color plane; determining a threshold based on the range of interest; and processing the input image using the threshold to generate an output image, wherein the range of interest is identified at least in part based on a known color intensity of the embedded element.

BRIEF DESCRIPTION OF DRAWINGS

The accompanying drawings are incorporated in and constitute a part of this specification and, together with the description, explain the advantages and principles of the invention. In the drawings.

FIGS. 2C-1 and 2C-2 illustrate a flow diagram of one example of an image preprocessing system;

In the drawings, like reference numerals indicate like elements. While the above-identified drawings, which may not be drawn to scale, set forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

Single and multi-dimensional codes embedded in tags are ubiquitous in the world. Applications in retail, shipping, and identification are everywhere. The hardware and software required to decode the tag ranges from custom equipment (e.g. point of sale laser scanners) to smart phones with embedded cameras. The image processing software required to decode the tags must perform a variety of tasks, including: 1) single or multiple tag identification in the possibly cluttered image; 2) tag orientation (e.g. rotation and translation); and 3) decoding and error detection/correction of the embedded codes.

The more cluttered the given image is, the more computational resources are required to process the image. In many cases (e.g. portable battery powered devices), computing resources are limited so processing time becomes a major problem. This problem is compounded when dealing with video streams, where processing time is constrained by the frame rate, or where the computing resources are performing multiple simultaneous tasks (e.g. image processing and rendering). Some embodiments of the present disclosure describe systems and methods for processing an image having an embedded element to generate an output image such that the embedded element in the output image can be extracted with less time and computing resource consumption. Some embodiments of the present disclosure describe a method of pre-processing an image which contains a single or multi-dimensional coded element (e.g. 2D code) such that the element can be decoded faster and more efficiently by decoding software. In some embodiments, the method includes the steps of selecting a color channel from the input having one or more embedded elements, which can be a sequence of images or a still image, processing the color channel of the input to generate data distribution information to separate the embedded element(s) from other elements in the input, determining a threshold based on the processed data, and generating an output image based on the threshold. In some embodiments, the method includes the steps of separating the image into its N constituent colors, choosing one of the N colors, processing that color constituent to maximize the embedded element(s) and minimize all other elements, and then generating an output image, which will be provided to image processing software to extract information from the embedded element(s), for example, decoding software.

The functions, algorithms, and methodologies described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules or processors, which may be software, hardware, firmware or any combination thereof. Multiple functions may be performed in one or more modules or processors as desired, and the embodiments described are merely examples. The software may be executed on a digital signal processor, ASIC, microprocessor, or other type of processor operating on a computer system, such as a personal computer, server or other computer system, turning such a computer system into a specifically programmed machine.

In some cases, the embedded element is a one dimensional or two-dimensional element having a differentiable symbolic meaning. In some cases, the embedded element is a graphical element. In some embodiments, the embedded element is a code, which can be a one dimensional or multidimensional code. In some cases, the embedded element is an obscured code. An obscured code refers to a code that is not normally visible to the human eye, but, with the use of specialized equipment, can be rendered visible to the human eye or readable by specialized equipment. Examples of obscured codes are codes visible in wavelengths invisible to the human eye, for example, infrared codes, ultraviolet codes, or codes which rely on manipulation of light polarization.

Figure 1:
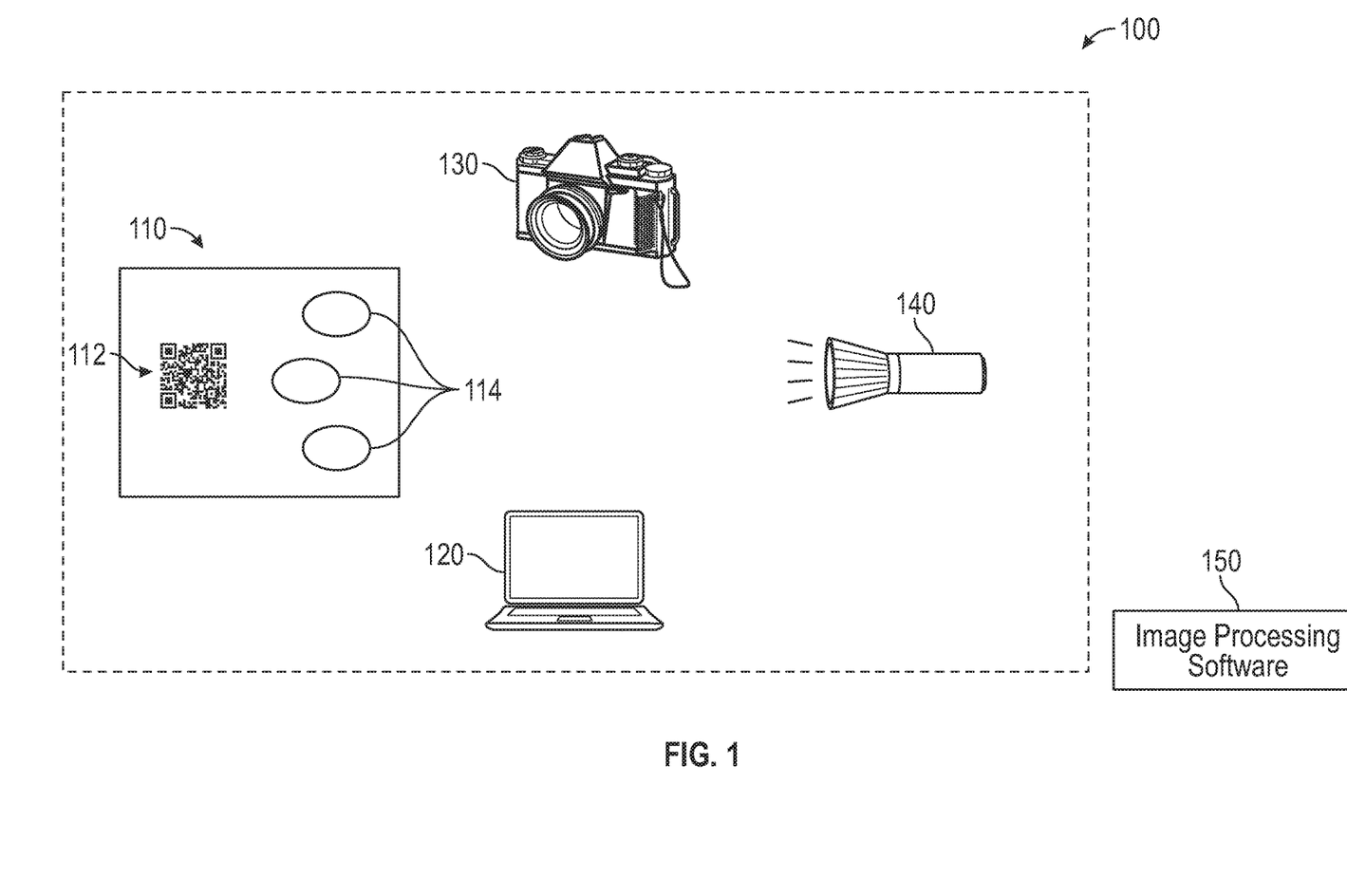
FIG. 1 illustrates a system diagram of one example of an image preprocessing system.

FIG. 1 illustrates a system diagram of one example of an image preprocessing system 100. In the illustrated example, the system 100 includes image data 110 including an embedded element 112 and other elements 114, an image capturing device 130, and a computing device 120, and an optional illumination device 140. The image preprocessing system 100 will provide the output image to image processing software 150 for further processing, for example, code extraction, decoding, or the like.

In some embodiments, image capture device 130 is a camera or other component configured to capture image data, for example, a video stream, a sequential image, or a still image. In some examples, the image capture device 130 can be a camera of a mobile device. In some cases, image capture device 130 may comprise other components capable of capturing image data, such as a video recorder, an infrared camera, a CCD (Charge Coupled Device) or CMOS array, a laser scanner, or the like. Additionally, the captured image data 110 can include at least one of an image, a video, a sequence of images (i.e., multiple images taken within a time period and/or with an order), a collection of images, or the like, and the term input image is used herein to refer to the various example types of image data.

In some embodiments, the illumination device 140 (e.g. camera flash unit) capable of emitting 2 or more simultaneous wavelengths and controllable by the computing device 120 and/or the imaging capture device 130. In some cases, the illumination device 140 can output human eye visible and invisible wavelengths (e.g. infrared or ultraviolet light) assuming that the imaging capture device 130 is sensitive to the selected wavelengths.

In some embodiments, the embedded element 112 and/or at least one of the other elements 114 have a known image attribute, such that the computing device 120 can select a preprocessing approach based on the known image attribute. An image attribute refers to an attribute identifiable in an image, for example, color intensity, texture, and the like.

The computing device 120 can be any device, server, or equipment having computing power, including but not limited to, circuits, a computer, a processor, a processing unit, a mobile device, a microprocessor, a tablet computer, or the like. In some cases, the computing device 120 can be implemented on a shared computing device. Alternatively, a component of the computing device 120 can be implemented on multiple computing devices. In some implementations, various modules and components of the computing device 120 can be implemented as software, hardware, firmware, or a combination thereof.

In some embodiments, the preprocessing system 100 is designed to preprocess the image to generate an output image for standard decoding software of single and multi-dimensional coded images (e.g. QR codes) which utilize high visibility materials, particularly those tags with retro-reflective materials, which are illuminated by the illumination device 140. Some embodiments of the present disclosure can be used in conjunction with decoding software on resource limited hardware such as smartphones or embedded systems with embedded or connected color cameras/imagers equipped with multi-wavelength (e.g. white or RGB light) illumination sources. In some cases, the preprocessing system 100 can reduce the clutter in a captured image by enhancing embedded element(s) of interest in the image and suppressing other elements, including the background. In some cases, the preprocessing system 100 is optimized for speed rather than object identification which makes it useful for scanning video streams, sequential images (e.g. ticket scanning), or panoramic static imagery (e.g. tags on walls).

Figures 2A, 2B:
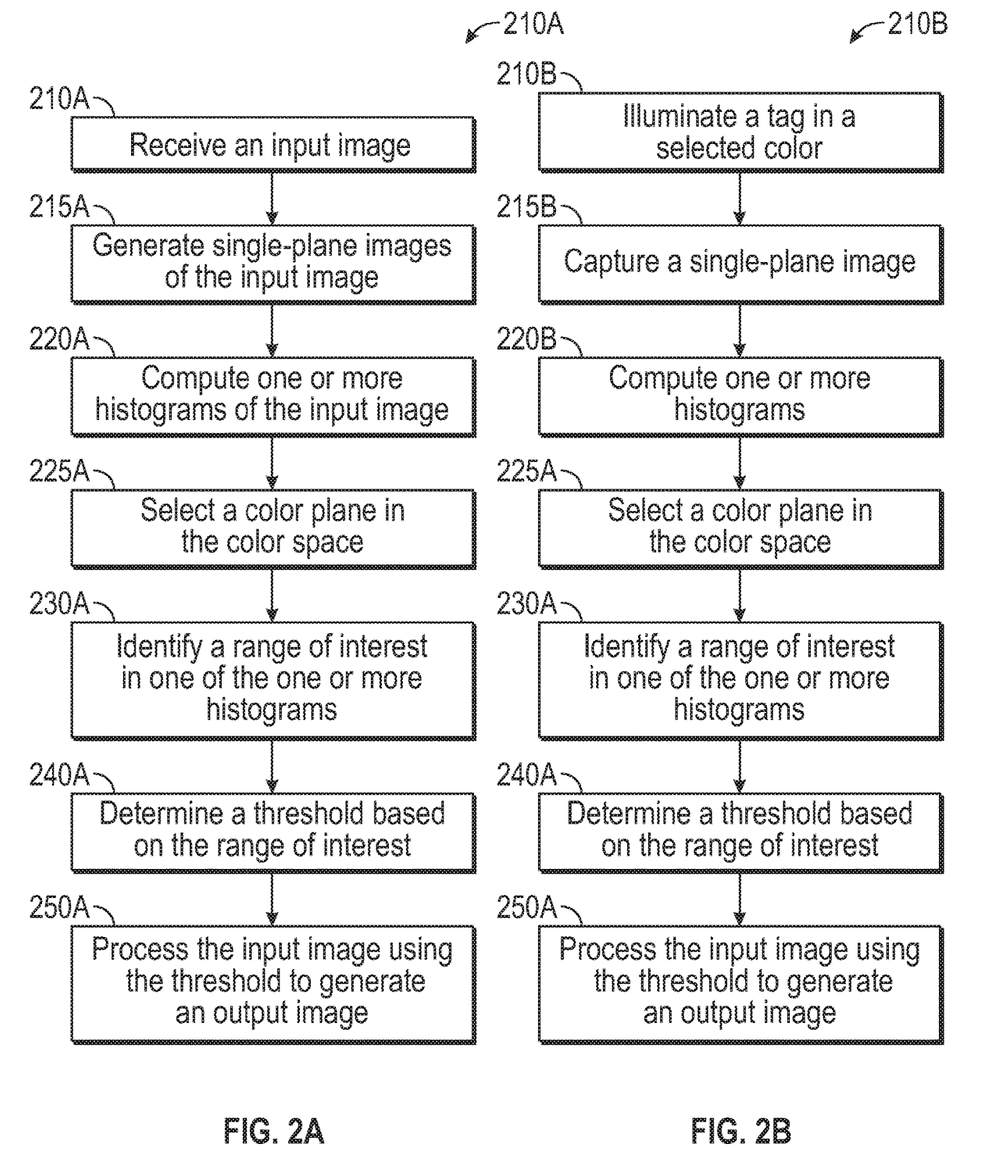
FIG. 2A is one example of a flow diagram of an image preprocessing system.
FIG. 2B is another example of a flow diagram of an image preprocessing system.

FIG. 2A is one example of a flow diagram of an image preprocessing system. In some cases, the sequence of steps in the flow diagram may not have the exact order. The image preprocessing system first receives an input image (step 210A), where the input image can be a video stream, a sequence of images, or a still image. In some cases, the input image is captured by an image capture device. In some cases, the preprocessing system generates single-plane images (step 215A), where each single-plane image corresponds to a color plane in the color space of the input image. The applicable color spaces include, but not limited to, RGB (red, green, and blue), LAB (e.g., Hunter 1948 L,a,b color space, CIE 1976 (L*, a*, b*) color space), CMYK(cyan, magenta, yellow, and key (black)), HSV (hue, saturation, and value), HSL (hue, saturation, and lightness), HSI (hue, saturation, and intensity), sRGB (standard red, green, and blue) color space. In one example, a single-plane image is generated by utilizing a Bayer filter on the input image such that each pixel is made up of a combination of three primary colored (e.g., red, green, and blue) subpixels; a color plane is made up of same color subpixels over the rectangular array of pixels.

For a specific color plane, a new image, referred to as P-Image, is generated with the color plane data. In one example, a P-Image contains the chosen color plane data only, such that P-Image is then one third of the size of the original input image in a color space having three color planes. As another example, the P-Image can be constructed by replicating the chosen color plane data in the remaining color planes such that the P-Image size equals the original image size. As one example for an input image in the RGB color space, if the Red plane was chosen, the Green and Blue planes would be populated with the corresponding Red data. The P-Image would have a third of the image resolution of the original image. As another example of constructing a P-image, apply functions F1 (chosen plane) and F2 (chosen plane) to the chosen single-plane image data to generate the data for the remaining color planes; the P-Image size would equal to the original image size. Examples of functions could be, but are not limited to, linear functions (e.g.

Fn(pixel)=K*pixel) or nonlinear functions (e.g. Fn(pixel)=If (pixel=<K) Then pixel=0 Else pixel=1).

After P-Image is generated, it is translated into a grayscale image, for example, to simplify the computation and reduce the amount of time and/or resources of computing. P-Image can be converted to grayscale in several ways.
 i. If P-Image uses the chosen single-plane data only, it is already multi-bit grayscale;
 ii. If P-Image is in RGB format with chosen plane data, then it can be translated into grayscale format by applying a translation function, GS(R,G,B), to generate the grayscale image. Some example functions include but are not limited to, for each pixel with values of R in red channel, G in green channel, and B in blue channel:

$$GS(R,G,B)=[\max(R,G,B)+\min(R,G,B)]/2 \quad (1)$$

$$GS(R,G,B)=(R+G+B)/3 \quad (2)$$

$$GS(R,G,B)=0.21*R+0.72*G+0.07*B \quad (3)$$

P-Image can also be converted to 1-bit grayscale by thresholding, where the greyscale pixel value is 1 or 0 depending on whether the P-Image pixel value is greater than a predetermined threshold. In some cases where multi-bit data is desirable, thresholded pixels can be assigned values 0 or [(2^Res)−1], where Res is the pixel resolution in bits. For example, if Res=8 bits, values are 0 and 255.

Next, the system computes one or more histograms of the input image, each histogram corresponding to a single-plane of the image (220A). In some embodiments, the system selects a color plane in the color space of the input image (step 225A). In some cases, the color plane is selected based on the embedded element of interest captured in the input image, and/or other elements captured in the input image. In some cases, the color plane is selected based on a known color property of the embedded element of interest captured in the input image, and/or a known color property of other elements captured in the input image. For example, for an input image in RGB color space having a monitor in the background, a green color plane or a red color plane will be selected. In some cases, the color plane can be selected based on knowledge of the image capture device, the illumination device, the embedded element of interest, and the image background information, or optionally, it may be chosen by applying a function (e.g. image average or standard deviation) to the single-plane image data and calculating the best candidate. Possible choice criteria may include but are not limited to data distribution (i.e. histogram), image noise, image contrast, image statistics, and dynamic range.

In some cases, step 220A is done before step 225A. In some cases, step 225A is done before step 220A. Next, the system identifies a plurality of peak values or a range of interest in one of the one or more histograms (step 230A), where the one histogram is corresponding to the selected color plane. In some cases, the histogram is filtered to remove high frequency noise. In some cases, a convolutional matrix filter is used to smooth out high frequency noise. In one example, the kernel (K) for the filter is a 3×3 matrix K[0:2,0:2] where K[1,1]=0 and K[x<>1,y<>1]=1, such that the computation when applying the filter is simplified. In the above example, the kernel is chosen for speed rather than for fidelity. Other filters and kernels for filtering can be used. In some cases, the system selects a range of interest in the histogram of the selected color plane based on a known color intensity of the embedded element and/or other elements of the input image. In some cases, the system selects two or more peak values in the histogram by determining local maximum values, which is described in more details later.

The system determines a threshold based on the plurality of peak values or values in the range of interest (240A). In some example, the embedded element is an element having high color intensity. For example, the embedded element is a retroreflective tag. High intensity elements are often the brightest objects in the input image, for example, elements having pixel values close to the maximum pixel image value. In some embodiments, the threshold is calculated as a function of the plurality of peak values. In some cases, the threshold is calculated as a function of histogram values in the range of interests.

The system further processes the input image using the threshold to generate an output image (250A). After setting the Threshold Value, a thresholded image file T-Image[N, M]=Threshold(L-Image[N,M], Threshold-Value) is generated. The thresholded image file T-Image[N,M] can be passed to other image processing software, for example, decoding software.

FIG. 2B is another example of a flow diagram of an image preprocessing system. First, the system illuminates a tag, one example of an element of interest in a selected color (step 210B). In some cases, the selected color is a prime color. The system captures a single-plane image (step 215B). In some cases, the system may illuminate the tag with other color(s) and capture other single-plane image(s). The systems will compute one or more histograms of the input image(s) (step 220B). The other steps are the same as the steps in FIG. 2A.

Figure 2C:
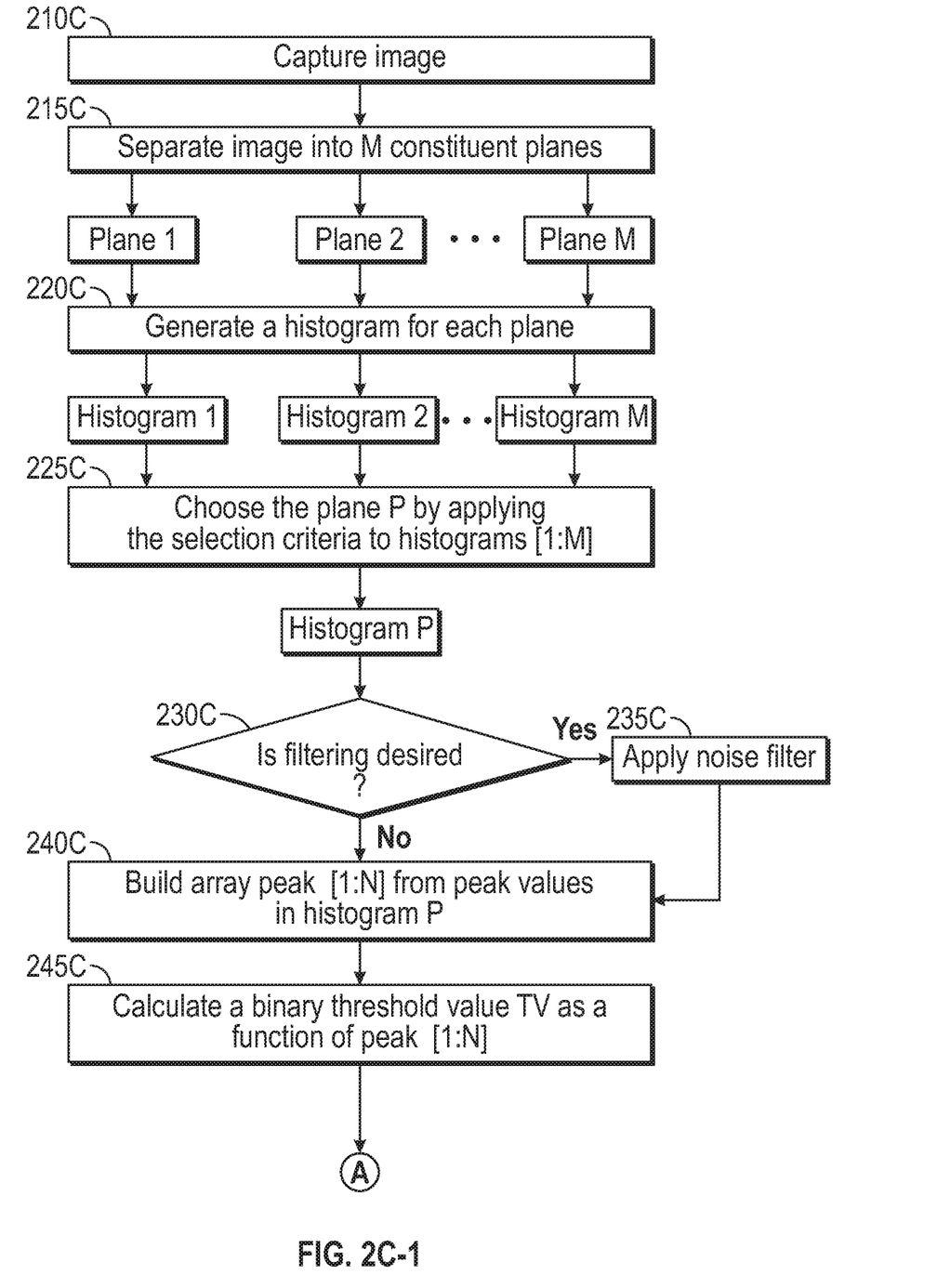
Figure 2C:
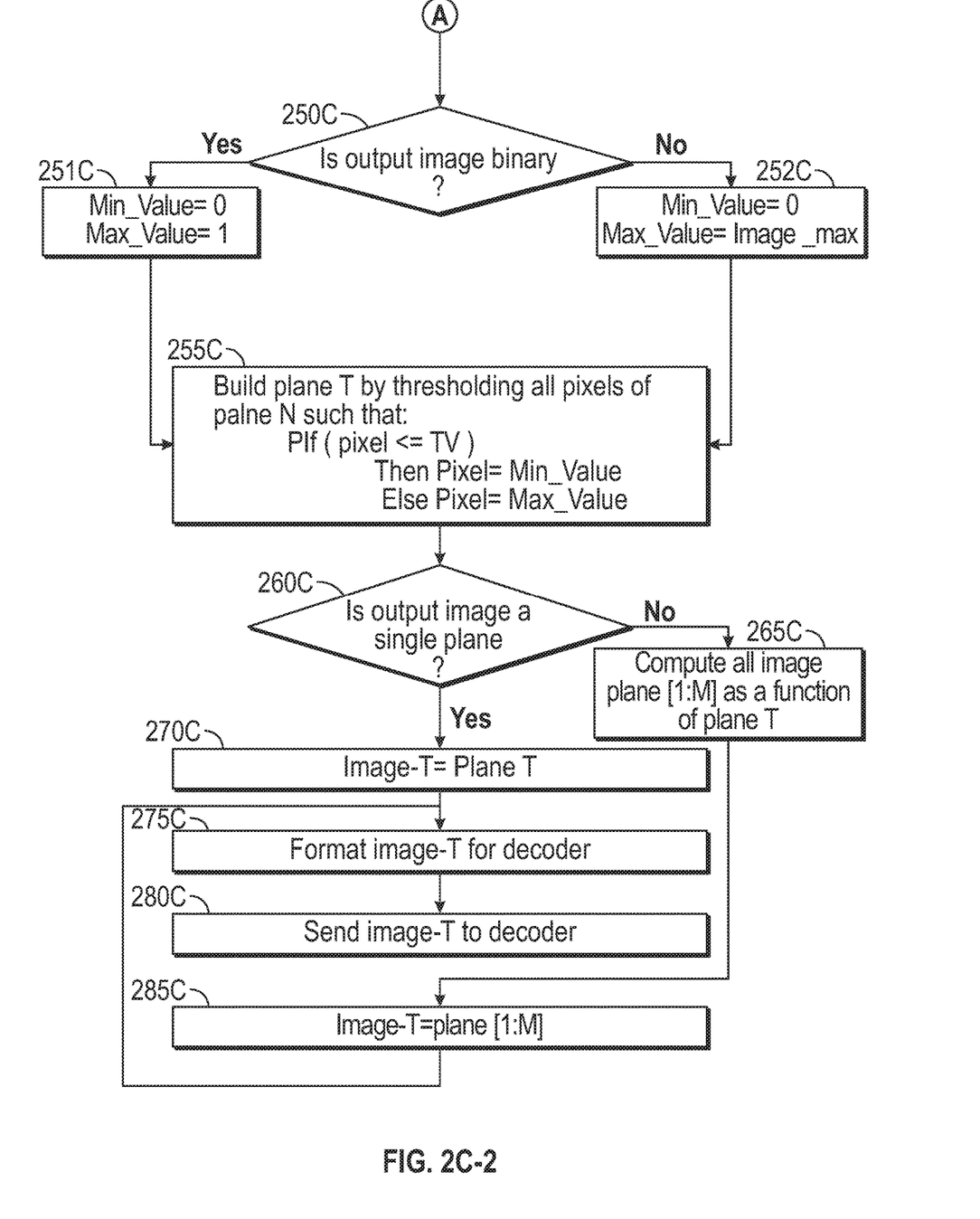

FIGS. 2C-1 and 2C-2 illustrate a flow diagram of one example of an image preprocessing system. Some of the steps are optional and some steps may be placed in different order. In this example, the system captures an image or receives an image (step 210C). Next, the system separates the image into M constituent plane images (step 215C). For example, the system separates an RGB image into a red plane image, a green plane image, and a blue plane image. The system generates a histogram for each plane image (step 220C) and then chooses a plane P by apply selection criteria described herein (step 225C). The system decides whether a filter should be applied (step 230C), either by evaluating the histogram for plane image P and/or by a configuration parameter; if yes, a noise filter will be applied (235C). Further, the system builds a peak array [1:N] from local peak values in histogram P (240C) and calculates a threshold value TB as a function of the peak array [1:N] (step 245C).

The system evaluates whether the output image should be binary image (step 250C) and if yes, set Min_Value=0 and Max_Value=1 (step 251C); and if no, set Min_Value=0 and Max_Value=Image_max, where Image_max=2^R−1 for image with R bit pixels (step 252C). The system will build a thresholded image T by thresholding all pixels of plane P such that Pixel=Min_Value if Pixel<=TV, otherwise Pixel=Max_Value (step 255C). The system receives input on whether the output image should be a single plane image (step 260C). The input may depend on the image processing software to receive the output image. If the output image is not a single plane image, the system may compute all image plane [1:M] as a function of plane T (step 265C) and create an output Image-T based on all planes (step 285C). If the output image is a single plane, the output Image-T=Plane T (step 270C). Optionally, the system formats Image-T for the decoding software or another processing software (step 275C). Further, the system sends or provides Image-T to the decoding software or another processing software (step 280C).

Figure 3A:
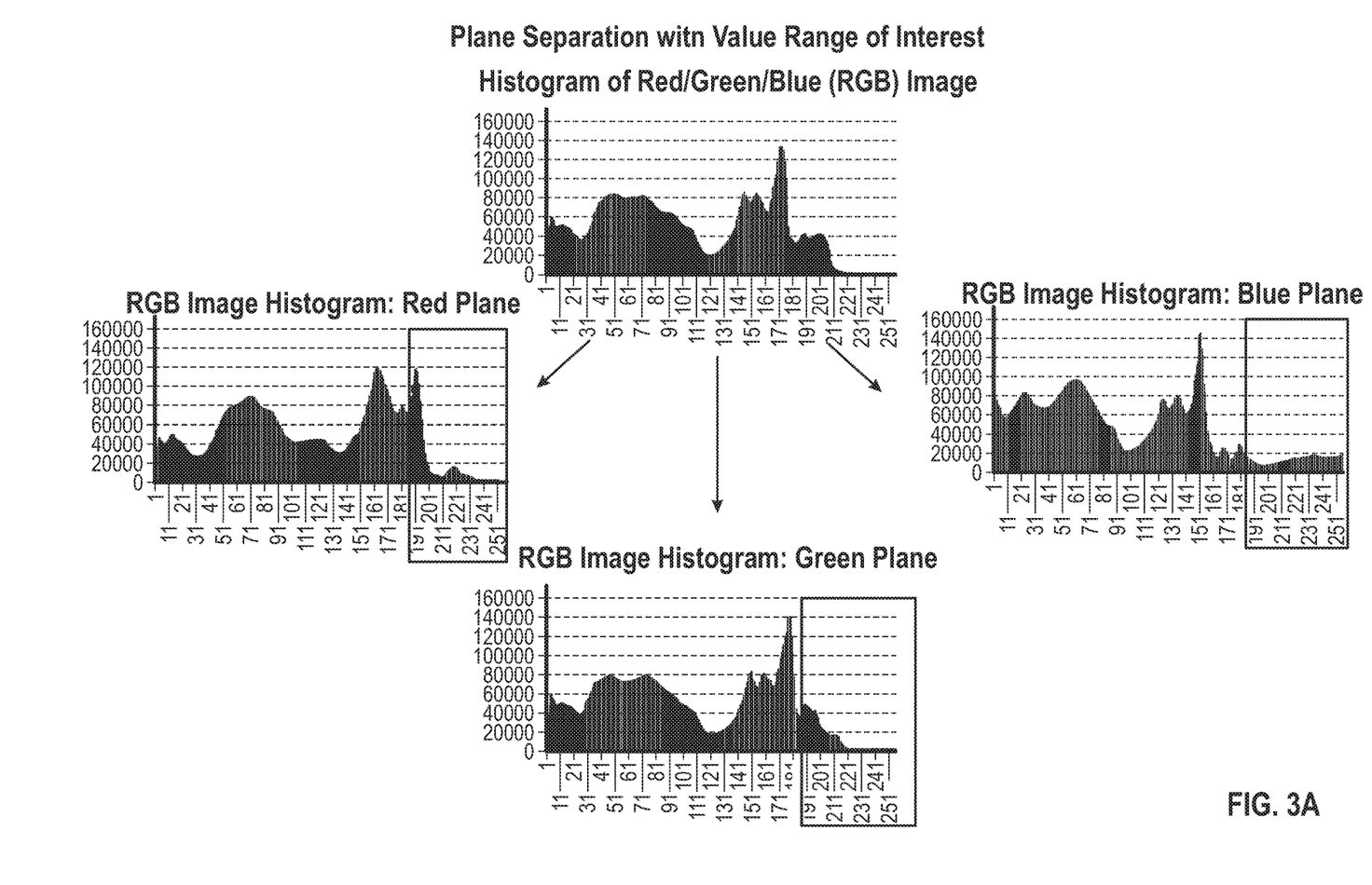
FIGS. 3A-3I illustrate one example process of image preprocessing system.

FIGS. 3A-3I illustrate one example process of image preprocessing system. FIG. 3A shows an example of the histogram of an RGB image (top of figure) that has been separated into its three constituent color planes (Red, Green, and Blue shown below left to right). In each color plane, a range of interest (ROI) corresponding to the probable value range for an element of interest is outlined. In some cases, the ROI is defined as a percentage of the maximum pixel value, e.g. the top 25% of the range of values (75% of max value to the max value). The ROI for each color plane is examined and, depending the characteristics, one or two planes are chosen. In the FIG. 3A example, the blue plane ROI is uniformly populated with many samples, so it is not a good candidate. The red plane has a very large peak at the lower end of the ROI which could might make finding the element of interest more difficult, in the example of the element of interest being the brightest object in the image. The Green plane is more sparsely populated with less high frequency noise, so it is the best candidate for this example.

Figure 3B:
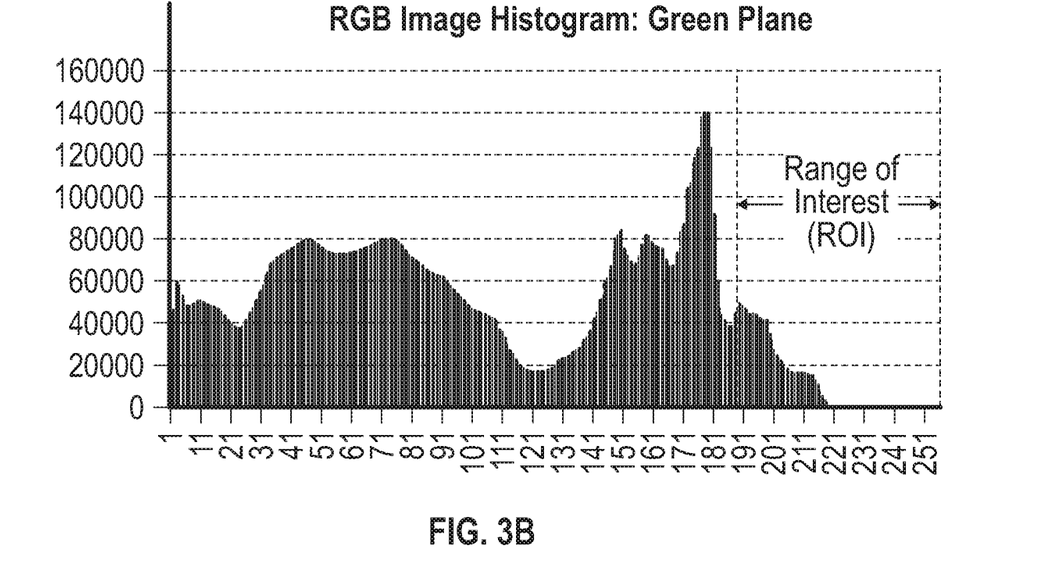
Figure 3C:
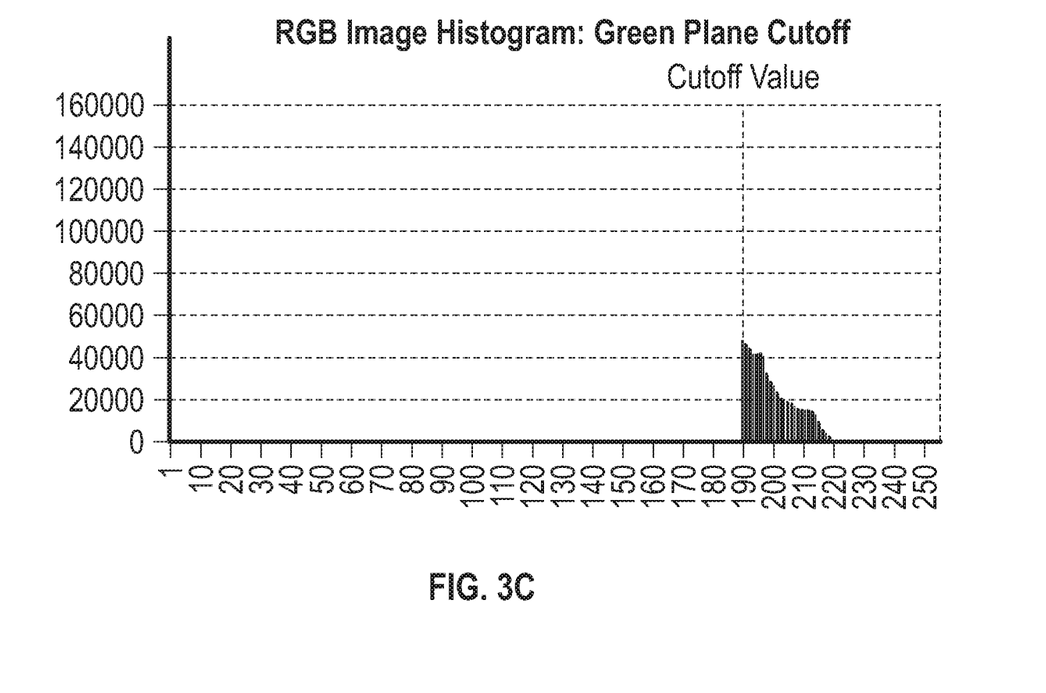
Figure 3D:
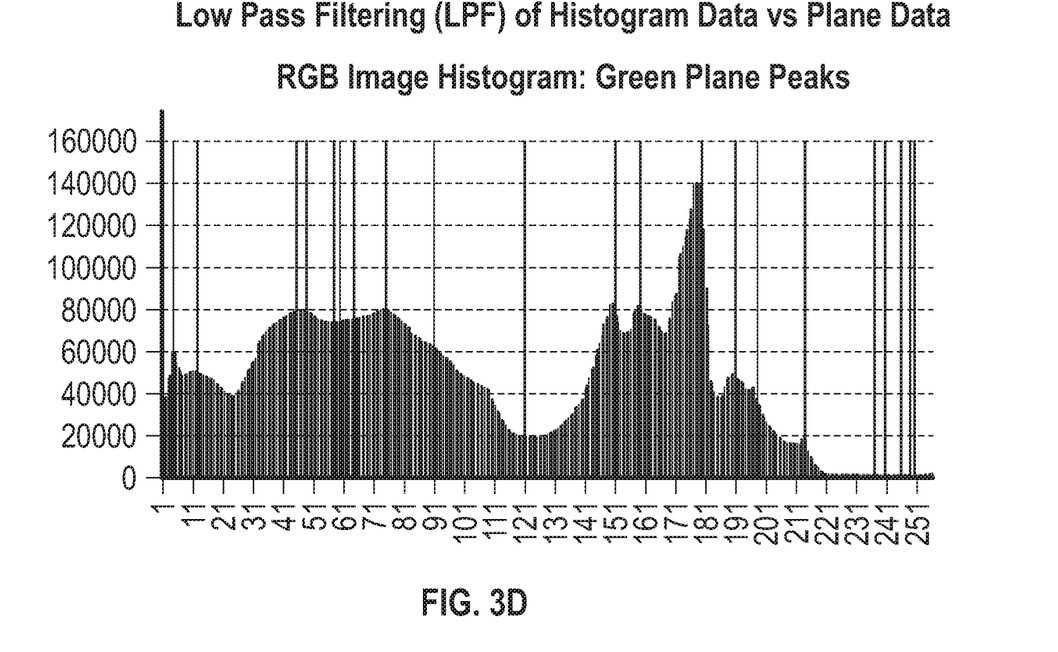
Figure 3E:
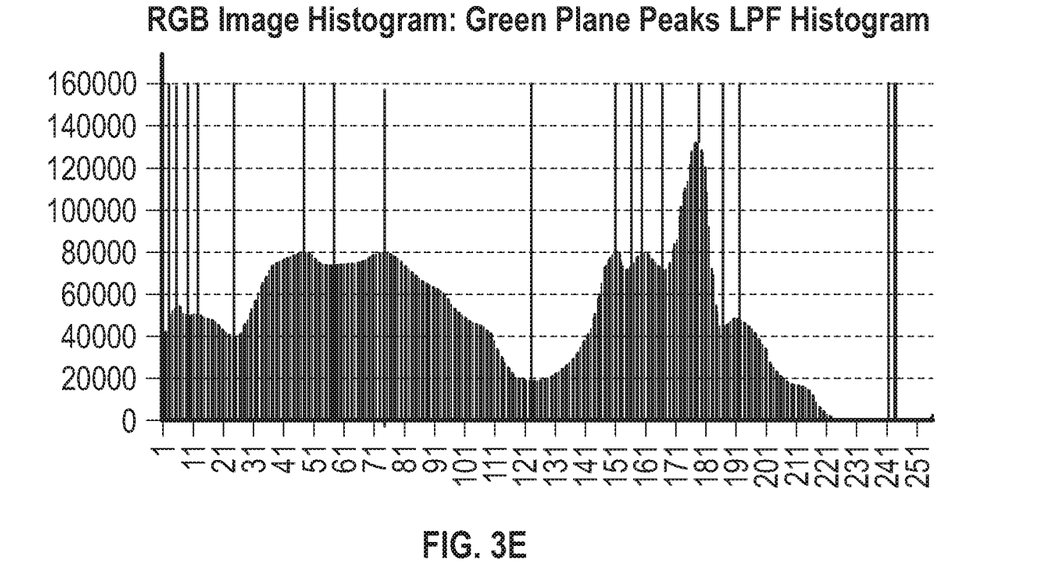
Figure 3F:
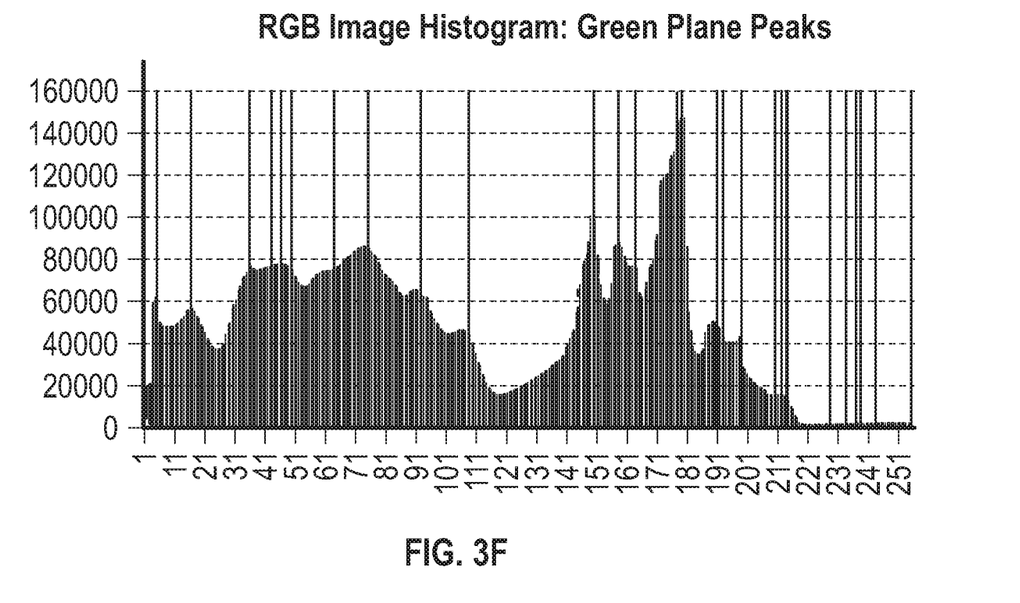

When a plane has been chosen, the system can make a choice as to whether the plane data or the histogram data require filtering. FIG. 3B shows the green plane histogram chosen in from the example RGB image of FIG. 3A. FIG. 3D shows unfiltered histogram; FIG. 3E shows a histogram filtered with a low pass filter (LPF); and FIG. 3F shows a histogram generated from the green plane data filtered by an LPF. For this example, filtering the plane data has not improved the resulting histogram, while filtering the histogram data has reduced some noise, especially in the ROI.

FIG. 3B shows the exemplary green plane histogram from FIG. 3A with the ROI delimited by dotted lines. As previously described, the ROI is the range of values most likely to contain the element of interest image data. Although thresholded images are easier to decode, a method which may yield acceptable results, is computationally fast, and does not require thresholding is to establish a cutoff value corresponding to the lowest value in the ROI and use it to transform the green plane pixel data according to the following rule:

If (CPix[X,Y]<Cutoff)
  Then TPix[X,Y]=0
  Else TPix[X,Y]=CPix[X,Y]

where CPix[X,Y] are pixel values from the chosen plane (e.g. green plane), and TPix[X,Y] are pixel values for the plane to be transmitted to image processing software, for example, decoding software. The histogram for the transformed exemplary Green plane is shown on the bottom of FIG. 3C.

Figure 3G:
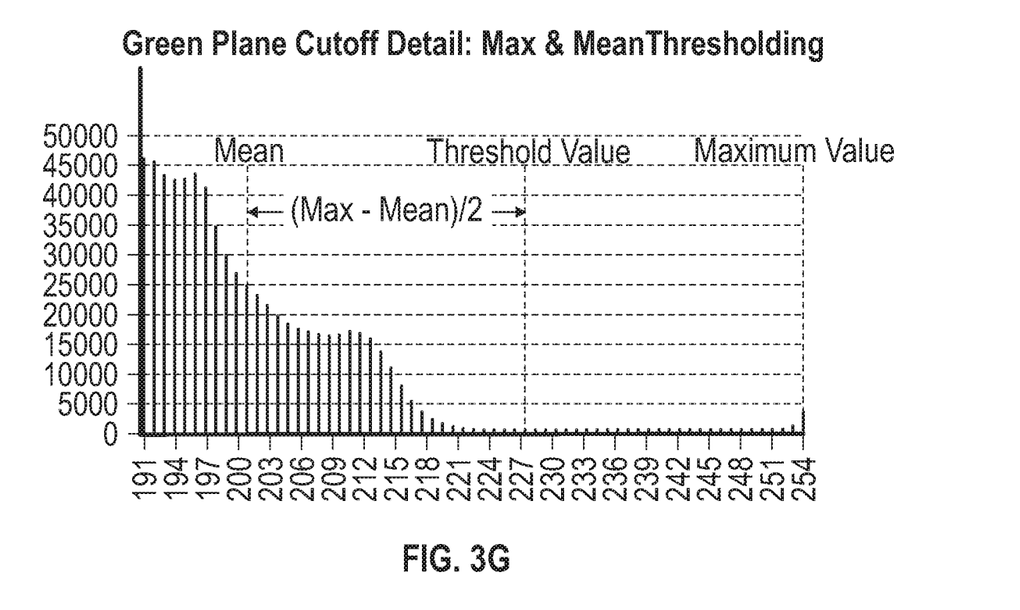
Figure 3H:
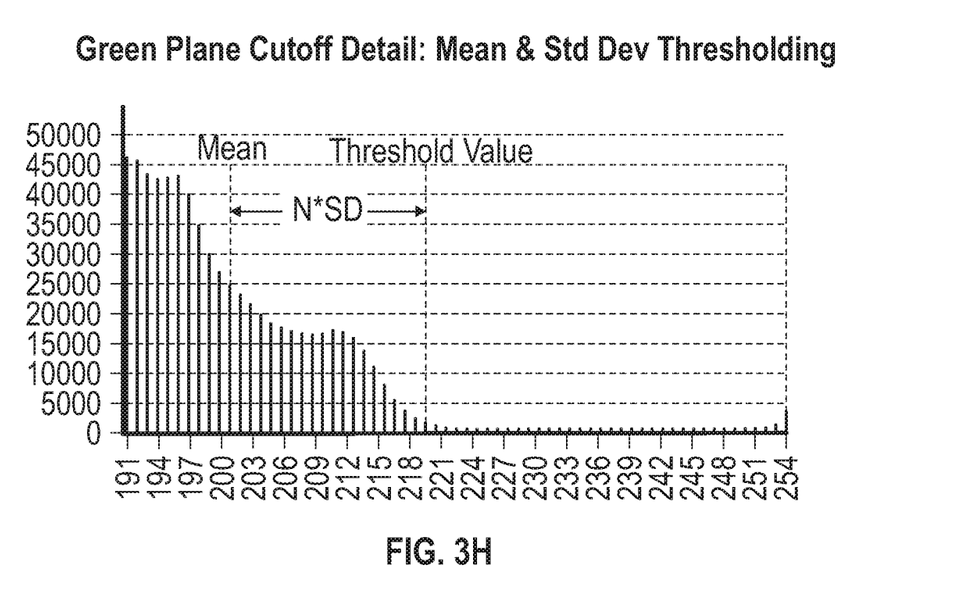
Figure 3I:
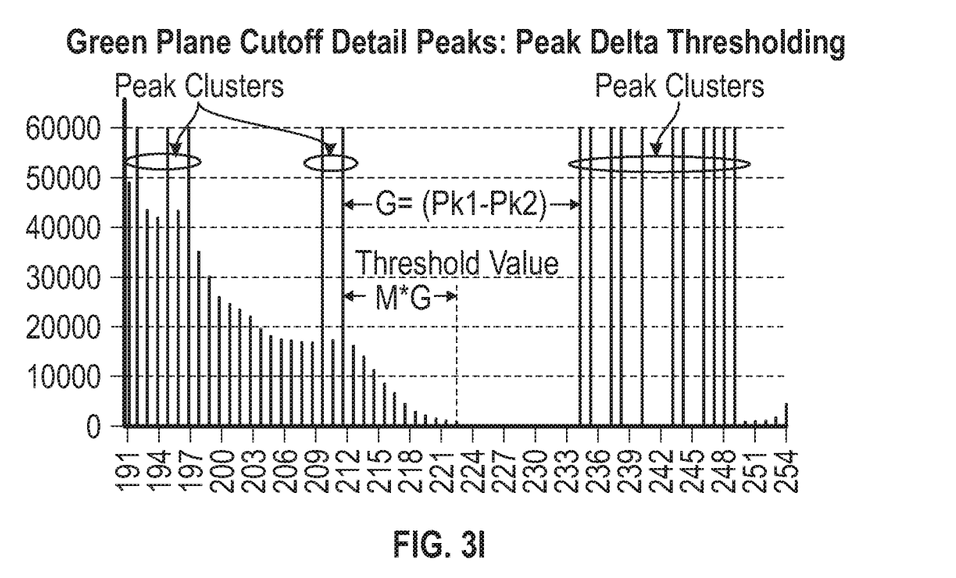

For cases where thresholding is desired, FIGS. 3G-3I show three examples of how a threshold value ("Threshold Value") can be computed. FIG. 3G shows the ROI of the exemplary green plane of FIG. 3A. In this histogram, the mean value of the ROI, mean, is calculated in the usual way. The mean value is subtracted from the maximum value, referred to as "Max", in the histogram (i.e. [$2^{Resolution}-1$] where Resolution is the pixel resolution in bits). This difference is divided by 2 and then added to the Mean value to yield the Threshold Value, such that $$\text{Threshold Value} = (\text{Max}-\text{Mean})/2 + \text{Mean} \quad (6)$$

FIG. 3H shows the ROI of the exemplary green plane of FIG. 3A. In this histogram, the mean value is again calculated along with the standard deviation, referred to as "SD", for the ROI. The Threshold Value is calculated as follows:

$$\text{Threshold Value} = \text{Mean} + N*\text{SD} \quad (7)$$

where N is a number between 1 and 2.

FIG. 3I shows the ROI of the exemplary green plane of FIG. 3A. In this histogram, vertical lines have been added which indicate peaks in the histogram. In this example, examination of the peaks show that they are clustered around three values (indicated by the circles); in other cases, the peaks might be more distinct. To calculate the Threshold value in this case, one would calculate the difference between the first peak minimum edge (or center if not clustered), Pk1, and the second peak maximum edge (or center if not clustered), Pk2; the difference is named G. The Threshold Value is calculated as follows:

$$G = Pk1 - Pk2$$

$$\text{Threshold Value} = Pk2 + M*G \quad (8)$$

Where M is a number between 0.25 and 0.75, and Pk1>Pk2.

Once the selected plane or planes have been processed (e.g. thresholded or transformed), the output image is assembled as described previously and then passed to software or processing unit for further processing.

Figure 4A:
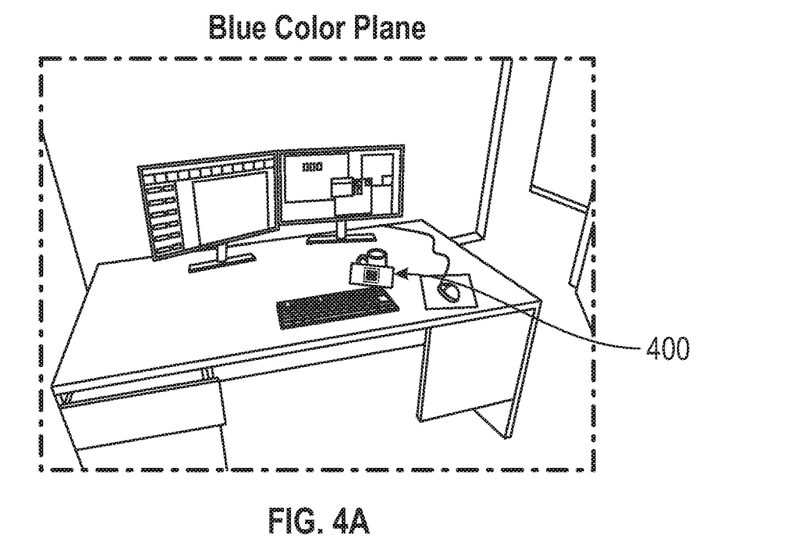
FIGS. 4A-4I illustrate one example of the image preprocessing system preprocessing an image with an element of interest, where FIGS. 4A, 4D, and 4G each is a single plane image for a workspace picture.
Figure 4B:
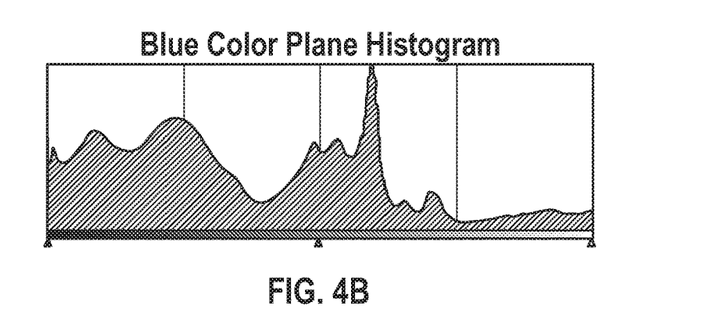
Figure 4C:
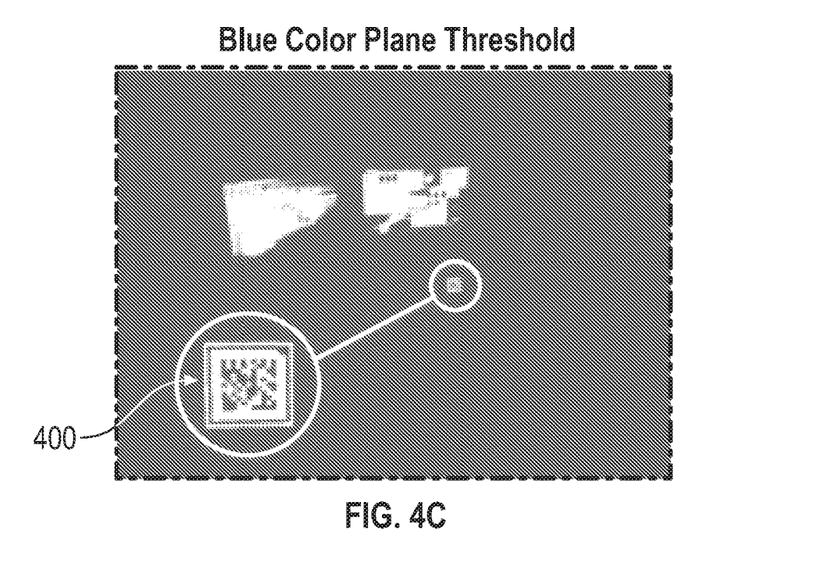
Figure 4D:
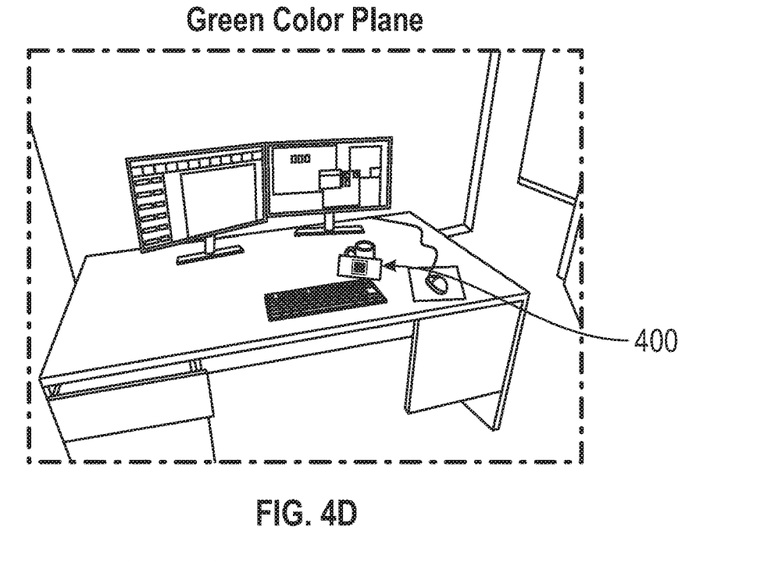
Figure 4E:
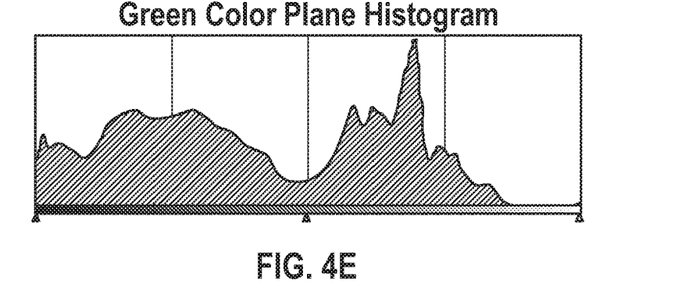
Figure 4F:
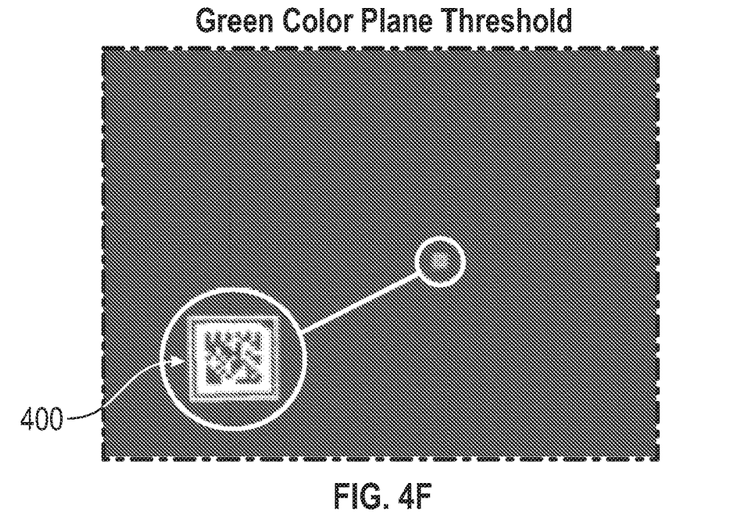
Figure 4G:
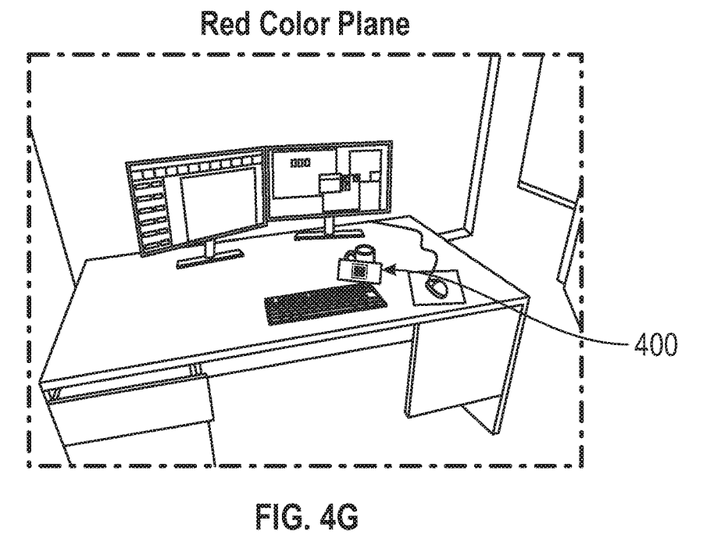
Figure 4H:
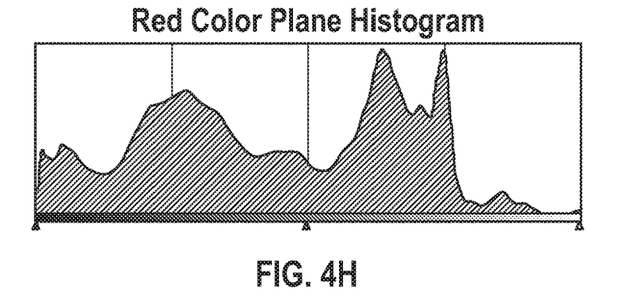

FIGS. 4A-4I illustrate one example of the image preprocessing system preprocessing an image with an element of interest 400. The system computes the histograms for each color plane image (as shown in FIGS. 4A, 4D, and 4G), where the histograms are shown in FIGS. 4B, 4E, 4H. The system selects the red plane image, because of its relatively smooth data distribution and the large difference between the white peak (data clustered around 255) and the dark peaks (approximately 75 and 115). Examining at the color plane images, the system finds that the blue plane has more high brightness objects (e.g., monitor screens) than the red and green planes. This is underscored in the histograms, where the blue histogram shows much more density in the right-most quadrant (i.e. highest brightness values) of the histogram. The green and red histograms are approximately equal in fourth quadrant density.

Figure 4I:
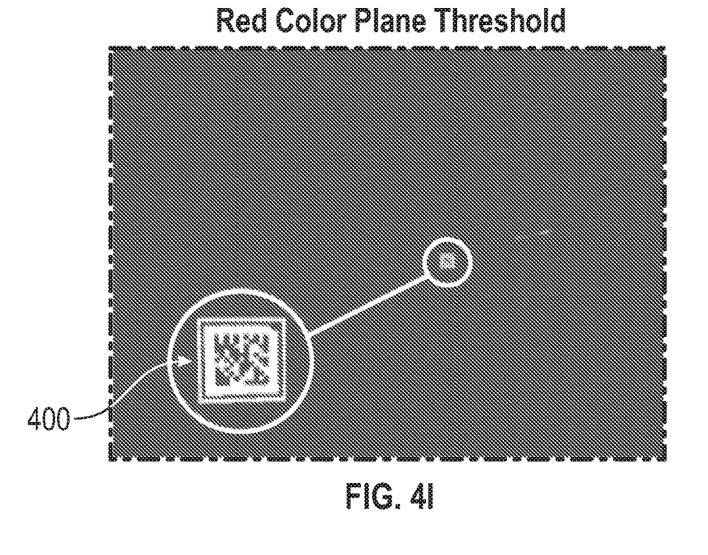

The system selects thresholds using one of the embodiments described above and generates thresholded images, as illustrated in FIGS. 4C, 4F, and 4I with the element of interest 400 enlarged. The system evaluates the thresholded color planes shows that one can easily isolate the element of interest in the red and green planes, but not in the blue plane, even though all three planes yield legible Tag images. Although the thresholded green plane has (marginally) less artifacts than the red plane, the red plane would be a better choice for thresholding because the first peak from the maximum value in the histogram (right end of the red histogram) is better defined than in the Green plane and would be easier to locate in software (e.g. using a differential and locating the local maxima and minima).

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims and their equivalents.

What is claimed is:

1. A method for processing an input image having an embedded element, the method comprising:
   computing, by a processor, for each respective color plane of one or more color planes in a color space of the input image, a respective histogram associated with the input image;
   selecting, by the processor, a selected color plane from the one or more color planes in the color space;
   identifying, by the processor, a range of interest in a first histogram of the respective histograms based on (i) a first known color property of the embedded element and (ii) a second known color property of an element different from the embedded element and represented in the input image, wherein the first histogram is computed on the selected color plane;
   determining, by the processor, a threshold value based on the range of interest; and
   processing, by the processor, the input image based on the threshold value to generate, based on the threshold value, an output image that is a binary image, wherein a pixel of the output image has a maximum value if the color intensity of the pixel is greater than the threshold value or has a minimum value if the color intensity of the pixel is lower than or equal to the threshold value.

2. The method of claim 1, wherein the input image is one of a still image or a sequence of images.

3. The method of claim 1, further comprising extracting, by a processor, a representation of the embedded element from the output image.

4. The method of claim 1, wherein the embedded element comprises a code, the method further comprising interpreting, by the processor, coded information from the embedded element, the coded information representing the code.

5. The method of claim 4, wherein the code is a two-dimensional code.

6. The method of claim 4, wherein the code is a one-dimensional code.

7. The method of claim 1, further comprising filtering, by the processor, the first histogram with a filter before identifying the range of interest.

8. The method of claim 7, wherein the filter comprises a low pass filter.

9. The method of claim 8, wherein a kernel of the low pass filter is a 3×3 matrix $K[0:2,0:2]$ where $K[1,1]=0$ and $K[x<>1,y<>1]=1$.

10. The method of claim 1, wherein the maximum value is calculated with a formula of $2^r-1$, where r is a pixel resolution of the output image, and wherein the minimum value is 0.

11. The method of claim 1, wherein the threshold value is a function of histogram values in the range of interest.

12. The method of claim 1, wherein the first known color property of the embedded element is a color intensity proximate to a highest peak value in the first histogram.

13. A device comprising:
   a memory device configured to store an input image having an embedded element; and
   a processor coupled to the memory device, the processor being configured to:
      compute, for each respective color plane of one or more color planes in a color space of the input image stored to the memory device, a respective histogram associated with the input image;
      select a selected color plane from the one or more color planes in the color space;
      identify a range of interest in a first histogram of the respective histograms based on (i) a first known color property of the embedded element and (ii) a second known color property of an element different from the embedded element and represented in the input image, wherein the first histogram is computed on the selected color plane;
      determine a threshold value based on the range of interest; and
      process the input image based on the threshold value to generate, based on the threshold value, an output image that is a binary image, wherein a pixel of the output image has a maximum value if the color intensity of the pixel is greater than the threshold value or has a minimum value if the color intensity of the pixel is lower than or equal to the threshold value.

14. The device of claim 13, wherein the input image is one of a still image or a sequence of images.

15. The device of claim 13, wherein the processor is further configured to filter the first histogram with a filter before the range of interest is identified.

* * * * *